United States Patent
Ku

(10) Patent No.: US 8,510,897 B2
(45) Date of Patent: Aug. 20, 2013

(54) WINDSHIELD WIPER ARM CONNECTOR

(75) Inventor: Yuan-Chin Ku, New Taipei (TW)

(73) Assignee: Dongguan Hongyi Wiper Co., Ltd. (CN)

( * ) Notice: Subject to any disclaimer, the term of this patent is extended or adjusted under 35 U.S.C. 154(b) by 185 days.

(21) Appl. No.: 13/083,046

(22) Filed: Apr. 8, 2011

(65) Prior Publication Data

US 2012/0222231 A1    Sep. 6, 2012

(30) Foreign Application Priority Data

Mar. 4, 2011    (CN) .......................... 2011 1 0052027

(51) Int. Cl.
*B60S 1/40*    (2006.01)

(52) U.S. Cl.
USPC ..................................... 15/250.32

(58) Field of Classification Search
USPC ........... 15/250.32, 250.43, 250.201, 250.361, 15/250.351, 250.44
See application file for complete search history.

(56) References Cited

U.S. PATENT DOCUMENTS

| 2,643,410 | A | * | 6/1953 | Nesson | ....................... | 15/250.32 |
| 4,094,039 | A | * | 6/1978 | Waterman et al. | .......... | 15/250.32 |
| 6,681,440 | B2 | * | 1/2004 | Zimmer et al. | ............ | 15/250.32 |
| 2010/0024149 | A1 | * | 2/2010 | Erdal | ......................... | 15/250.32 |

* cited by examiner

*Primary Examiner* — Mark Spisich
*Assistant Examiner* — Andrew A Horton
(74) *Attorney, Agent, or Firm* — Banner & Witcoff, Ltd.

(57) ABSTRACT

A windshield wiper arm connector includes a shell unit and a connecting member. The shell unit includes a stop wall, a pair of outer side walls extending from the stop wall, and a linking member connected to the outer side walls to define a receiving space thereamong. The shell unit is formed with an opening that is opposite to the linking member, that is in spatial communication with the receiving space, and that is adapted for extension of an end portion of a wiper arm therethrough into the receiving space. The connecting member is disposed on the linking member and is movable for connecting to and separating from the end portion of the wiper arm.

11 Claims, 4 Drawing Sheets

US 8,510,897 B2

WINDSHIELD WIPER ARM CONNECTOR

CROSS-REFERENCE TO RELATED APPLICATION

This application claims priority of Chinese Application No. 201110052027.1, filed on Mar. 4, 2011.

BACKGROUND OF THE INVENTION

1. Field of the Invention

The invention relates to a windshield wiper arm connector for connecting detachably a wiper arm to a wiper blade.

2. Description of the Related Art

As shown in FIGS. 1 and 2, U.S. patent application Publication No. 2006/0117515 A1 discloses a conventional windshield wiper arm connector 13 for linking a wiper blade 12 with a wiper arm 14. The conventional windshield wiper arm connector 13 has an elongated connecting segment 131 that is formed with an insertion opening 133, and a pair of parallel locking tongues 132 that extend longitudinally from the connecting segment 131. The windshield wiper arm connector 13 is connected detachably to a slide element 11 which is coupled to the wiper blade 12 before being connected to the wiper arm 14. When the wiper arm 14 is held in a manner that an included angle between the wiper arm 14 and the windshield wiper arm connector 13 ranges from 10 to 100 degrees, an insertion section 141 of the wiper arm 14 can be inserted into the connecting segment 131 through the insertion opening 133. Afterward, the wiper arm 14 has to be pivoted downwardly relative to the windshield wiper arm connector 13 until the insertion section 141 abuts against a projecting region 134 of the connecting segment 131, while lateral portions of the wiper arm 14 abut tightly and respectively against the locking tongues 132, thereby completing the assembling procedure of the wiper arm 14 to the windshield wiper arm connector 13. However, the abovementioned assembling procedure of the wiper arm 14 to the windshield wiper arm connector 13 is relatively complicated and troublesome.

SUMMARY OF THE INVENTION

Therefore, an object of the present invention is to provide a windshield wiper arm connector that is relatively easy to be coupled to a wiper arm.

Another object of the present invention is to provide a windshield wiper assembly that comprises a wiper arm connector that is relatively easy to be coupled to a wiper arm.

Accordingly, a windshield wiper arm connector of the present invention is adapted for connecting detachably a wiper arm to a wiper blade. The windshield wiper arm connector comprises a shell unit and a connecting member. The shell unit is adapted to be connected separably to the wiper blade, and includes a stop wall, a pair of outer side walls, and a linking member. The stop wall extends in an axial direction, and has first and second sides opposite to each other in the axial direction and lateral ends opposite to each other in a transverse direction transverse to the axial direction. The outer side walls extend respectively from the lateral ends of the stop wall. Each of the outer side walls has first and second sides that correspond respectively in position to the first and second sides of the stop wall. The linking member is connected to the first sides of the outer side walls, and cooperates with the stop wall and the outer side walls to define a receiving space adapted for receiving an end portion of the wiper arm. The shell unit is formed with an opening that is defined cooperatively by the second side of the stop wall and the second sides of the outer side walls, that is in spatial communication with the receiving space, and that is adapted for extension of the end portion of the wiper arm therethrough into the receiving space. The connecting member is disposed on the linking member and is movable between a connected position adapted for connection to the end portion of the wiper arm, and a separated position adapted for separation from the end portion of the wiper arm.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
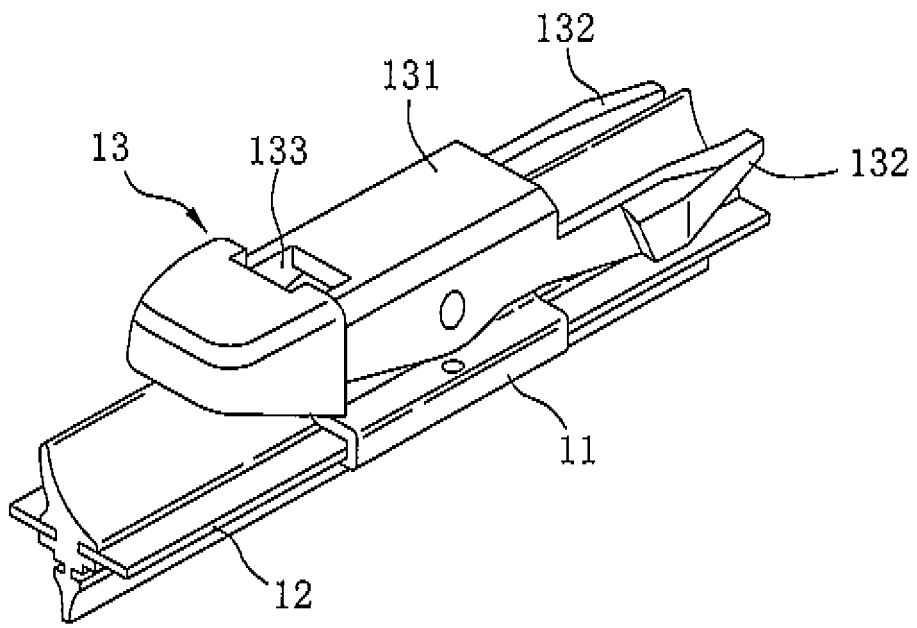
FIG. 1 is a perspective view of a conventional windshield wiper arm connector disclosed in U.S. patent application Publication No. 2006/0117515 A1.
Figure 2:
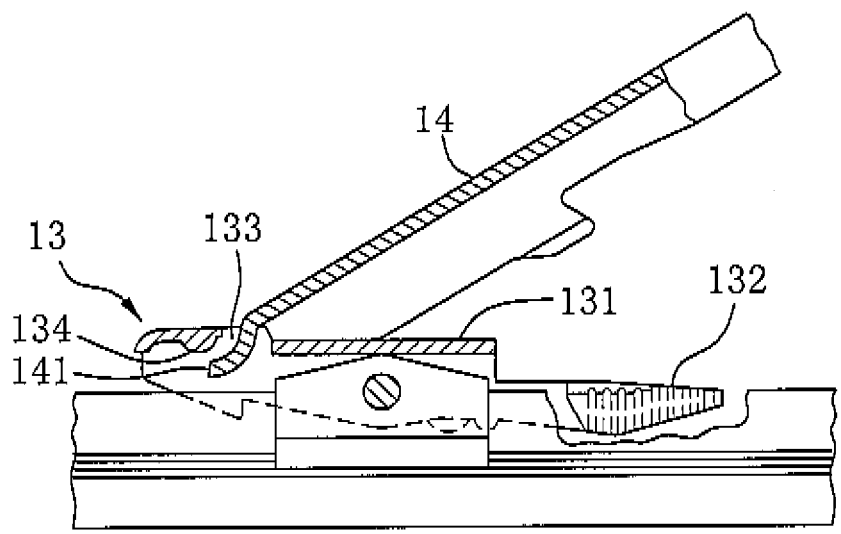
FIG. 2 is a schematic fragmentary sectional view of the conventional windshield wiper arm connector.
Figure 3:
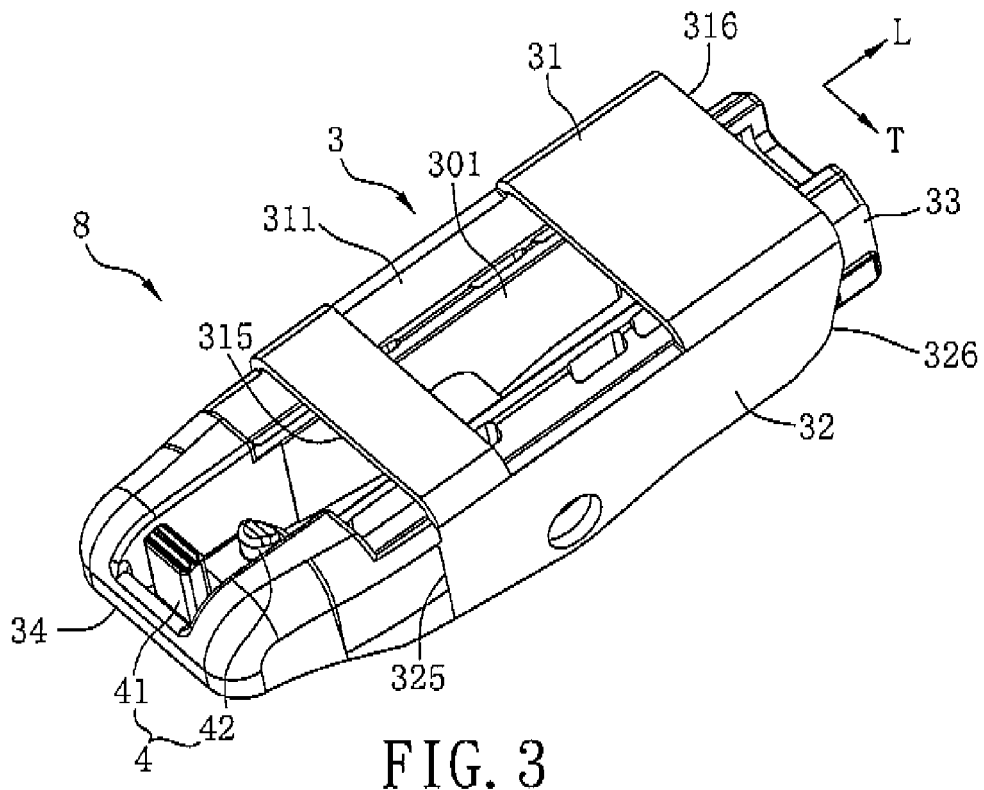
FIG. 3 is a perspective view of a preferred embodiment of a windshield wiper arm connector according to the invention.
Figure 4:
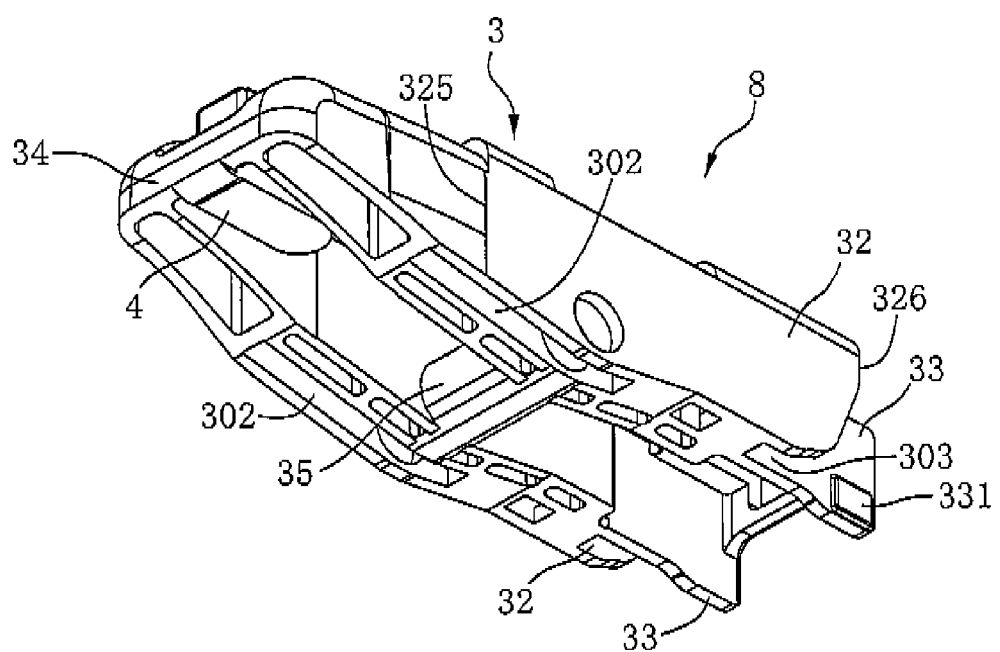
FIG. 4 is another perspective view of the preferred embodiment.
Figure 7:
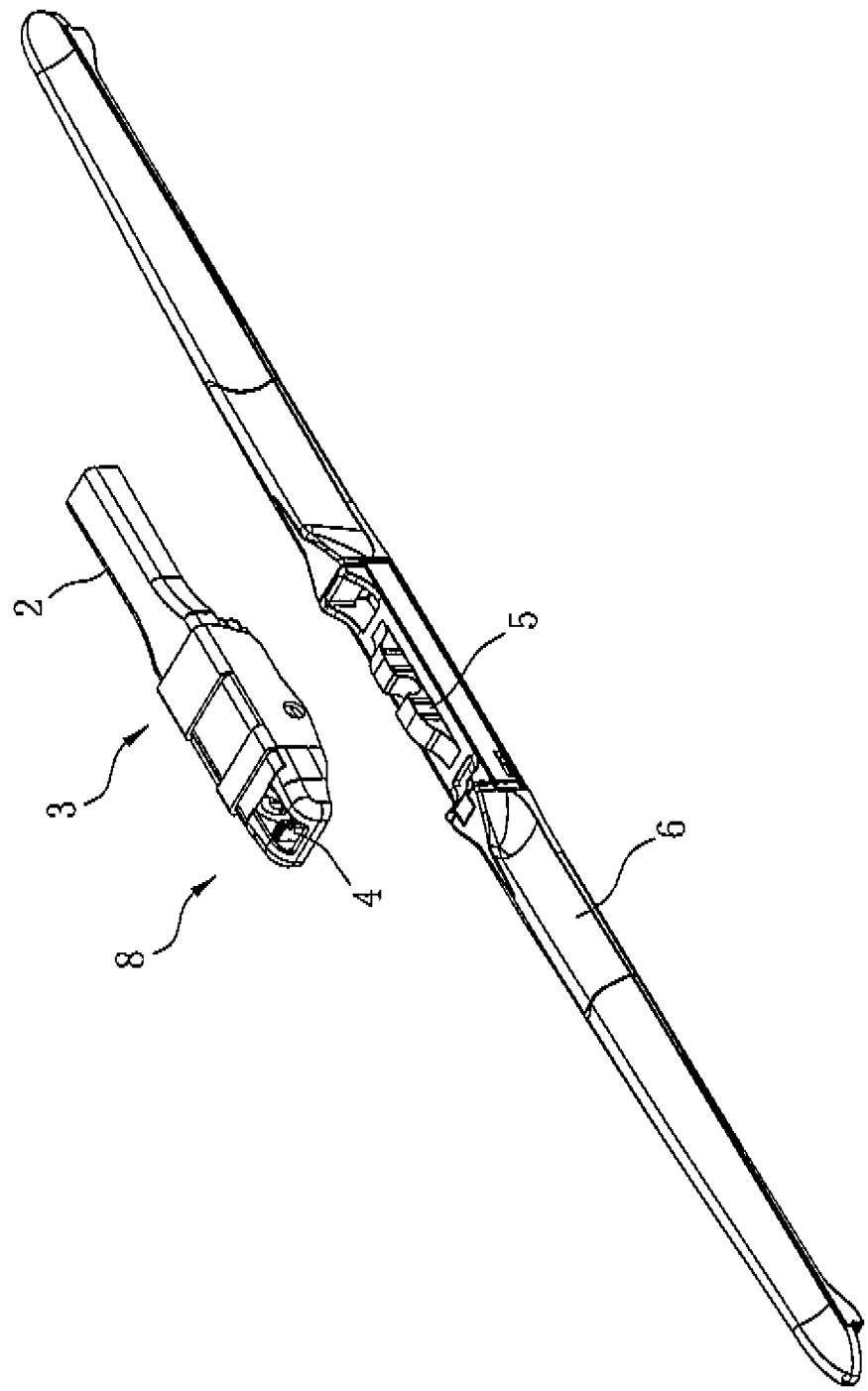
FIG. 7 is a partly exploded perspective view of a windshield wiper assembly provided with the preferred embodiment.

As shown in FIG. 7, the preferred embodiment of a windshield wiper arm connector 8 according to the present invention is adapted for use in a windshield wiper assembly, and is adapted to connect detachably a wiper arm 2 to a wiper blade 6 of the windshield wiper assembly. Referring to FIGS. 3 and 4, the windshield wiper arm connector 8 comprises a shell unit 3 and a connecting member 4.

The shell unit 3 includes a stop wall 31, a pair of outer side walls 32, a pair of inner side walls 33, and a linking member 34. The stop wall 31 extends in an axial direction (L), and has first and second sides 315, 316 opposite to each other in the axial direction (L) and lateral ends opposite to each other in a transverse direction (T) transverse to the axial direction (L). The outer side walls 32 extend respectively from the lateral ends of the stop wall 31. Each of the outer side walls 32 has first and second sides 325, 326 that correspond respectively in position to the first and second sides 315, 316 of the stop wall 31. The linking member 34 is connected to the first sides 325 of the outer side walls 32, and cooperates with the stop wall 31 and the outer side walls 32 to define a receiving space 301. The stop wall 31 is formed with a through hole 311 in spatial communication with the receiving space 301 so that the material consumed in producing the shell unit 3 can be reduced, thereby resulting in a relatively low manufacturing cost.

The shell unit 3 is formed with an opening 303 that is defined cooperatively by the second side 316 of the stop wall 31 and the second sides 326 of the outer side walls 32, and that is in spatial communication with the receiving space 301. The inner side walls 33 are disposed in the receiving space 301. Each of the inner side walls 33 is parallel to a respective one of the outer side walls 32, cooperates with the respective one of the outer side walls 32 to define a guide groove 302 that is in spatial communication with the opening 303, and is formed with a protrusion 331 (only one protrusion 331 is visible in FIGS. 3 and 4) at an end portion thereof opposite to the linking member 34 in the axial direction (L). In this embodiment, each protrusion 331 has an end surface that is distal from and parallel to a corresponding one of the inner side walls 33 and that has rounded edges. The shell unit 3 further includes a reinforcing rod 35 interconnecting the inner side walls 33. By virtue of the reinforcing rod 35 and the protrusions 331, the structural strength of the inner side walls 33 can be enhanced.

The connecting member 4 is disposed on the linking member 34, and has an L-shaped access portion 41 connected to the linking member 34 and resiliently swingable relative to the linking member 34, and an engaging portion 42 extending from and co-movable with the access portion 41. In this embodiment, the engaging portion 92 is formed as a post projecting from the access portion 41.

Figure 5:
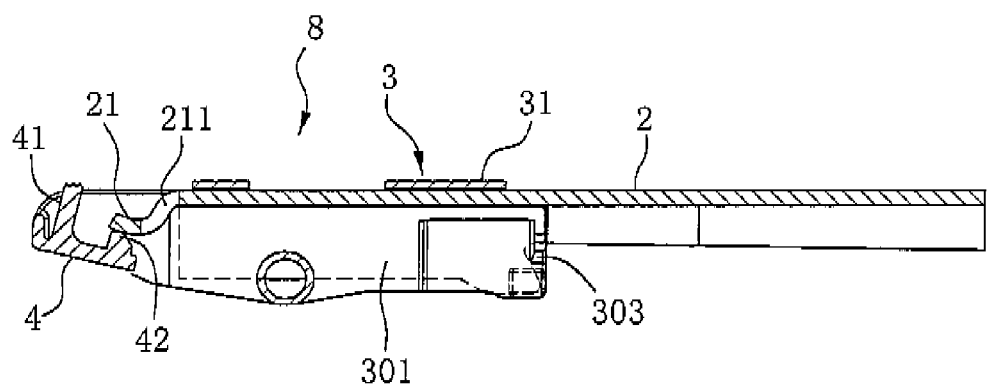
FIG. 5 is a sectional view of the preferred embodiment during the extension of a wiper arm into the preferred embodiment.
Figure 6:
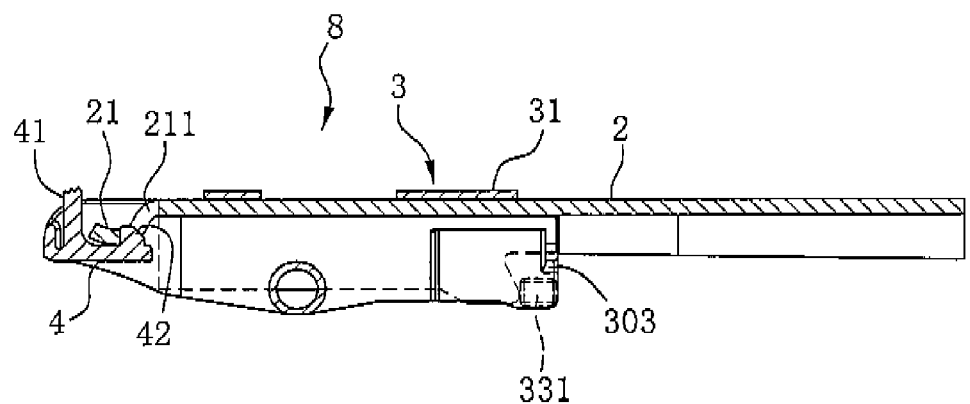
FIG. 6 is another sectional view of the preferred embodiment, illustrating a connecting member at the connected position connected to the wiper arm.

As shown in FIGS. 5 and 6, when assembling the windshield wiper arm connector 8 with the wiper arm 2, the wiper arm 2 has to be moved in the axial direction (L) with an end portion 21 thereof extending into the receiving space 301 through the opening 303 and contacting the engaging portion 42 of the connecting member 4. When the end portion 21 of the wiper arm 2 is kept being pushed in the axial direction (L), the access portion 41 is biased by the end portion 21 of the wiper arm 2 to swing downwardly to a separated position (see FIG. 5), where the engaging portion 42 is separated from the end portion 21 of the wiper arm 2 (i.e., not yet engaged to the end portion 21). When the end portion 21 of the wiper arm 2 is further pushed in the axial direction (L) until an engaging hole 211 in the end portion 21 is registered with the engaging portion 42, the access portion 41 swings resiliently and upwardly from the separated position to a connected position (see FIG. 6) and engages the engaging hole 211 in the end portion 21, thereby assembling the wiper arm 2 firmly with the windshield wiper arm connector 8.

The stop wall 31 and the outer and inner side walls 32, 33 are configured to correspond to the structure of the end portion 21 of the wiper arm 2 such that, during the extension of the end portion 21 into the receiving space 301, lateral sections of the end portion 21 are slidably and respectively retained in the guide grooves 302, and an intermediate section, which interconnects the lateral sections, is limited to move under the stop wall 31, thereby ensuring smooth extension of the end portion 21 into the receiving space 301. In addition, during the extension of the end portion 21 into the receiving space 301, the protrusions 331 on the inner side walls 33 abut slidably and respectively against the lateral sections of the end portion 21 until the connecting member 4 is at the connected position and the engaging portion 42 engages the end portion 21, thereby further enhancing the stability of the extension of the end portion 21 into the receiving space 301.

To separate the wiper arm 2 from the windshield wiper arm connector 8, the access portion 41 of the connecting member 4 has to be pushed downwardly to move from the connected position to the separated position, such that the engaging portion 42 is disengaged from the engaging hole 211 in the end portion 21. The end portion 21 can then be moved in the axial direction (L) for withdrawal from the receiving space 301. Therefore, compared to the abovementioned conventional windshield wiper arm connector disclosed in U.S. patent application Publication No. 2006/0117515 A1, the windshield wiper arm connector 8 of this invention is easier to be assembled with and disassembled from the wiper arm 2.

Referring once again to FIG. 7, by connecting detachably a connecting seat 5 to the wiper blade 6 and coupling detachably the reinforcing rod 35 (see FIG. 4) of the windshield wiper arm connector 8 to the connecting seat 5, the assembling procedure of the windshield wiper assembly can be easily completed.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A windshield wiper arm connector adapted for connecting detachably a wiper arm to a wiper blade, said windshield wiper arm connector comprising:
   a shell unit adapted to be connected separably to the wiper blade, and including
   a stop wall that extends in an axial direction, and that has first and second sides opposite to each other in the axial direction and lateral ends opposite to each other in a transverse direction transverse to the axial direction,
   a pair of outer side walls that extend respectively from the lateral ends of said stop wall, each of said outer side walls having first and second sides that correspond respectively in position to said first and second sides of said stop wall, and
   a linking member that is connected to said first sides of said outer side walls, and that cooperates with said stop wall and said outer side walls to define a receiving space adapted for receiving an end portion of the wiper arm, said shell unit being formed with an opening that is defined cooperatively by said second side of said stop wall and said second sides of said outer side walls, that is in spatial communication with said receiving space, and that is adapted for extension of the end portion of the wiper arm therethrough in the axial direction into said receiving space; and
   a connecting member disposed on said linking member and movable between a connected position adapted for connection to the end portion of the wiper arm, and a separated position adapted for separation from the end portion of the wiper arm.

2. The windshield wiper arm connector as claimed in claim 1, wherein said connecting member has an access portion connected to said linking member and resiliently swingable between the connected and separated positions, and an engaging portion connected to and co-movable with said access portion, said engaging portion being adapted to be connected to the end portion of the wiper arm when said access portion is at the connected position, and to be separated from the end portion of the wiper arm when said access portion is at the separated position.

3. The windshield wiper arm connector as claimed in claim 1, wherein said shell unit further includes a pair of inner side walls disposed in said receiving space, each of said inner side walls being parallel to a respective one of said outer side walls and cooperating with the respective one of said outer side walls to define a guide groove that is in spatial communication with said opening and that is adapted for retaining separably a portion of the wiper arm therein.

4. The windshield wiper arm connector as claimed in claim 3, wherein each of said inner side walls is formed with a protrusion at an end portion thereof opposite to said linking member in the axial direction, said protrusion being adapted to abut slidably against the portion of the wiper arm retained in a respective one of said guide grooves during the extension of the wiper arm into said receiving space until said connecting member is at the connected position and the end portion of the wiper arm is connected to said connecting member.

5. The windshield wiper arm connector as claim 4, wherein said protrusion has an end surface that is distal from and parallel to a corresponding one of said inner side walls and that has rounded edges.

6. The windshield wiper arm connector as claimed in claim 3, wherein said shell unit further includes a reinforcing rod interconnecting said inner side walls.

7. The windshield wiper arm connector as claimed in claim 1, wherein said stop wall is formed with a through hole that is in spatial communication with said receiving space.

8. A windshield wiper assembly adapted to be connected detachably to a wiper arm, said windshield wiper assembly comprising
a windshield wiper arm connector,
a wiper blade, and
a connecting seat connecting detachably said wiper blade to said windshield wiper arm connector,
wherein said windshield wiper arm connector includes:
a shell unit connected separably to said connecting seat, and including
a stop wall that extends in an axial direction, and that has first and second sides opposite to each other in the axial direction and lateral ends opposite to each other in a transverse direction transverse to the axial direction,
a pair of outer side walls that extend respectively from the lateral ends of said stop wall, each of said outer side walls having first and second sides that correspond respectively in position to said first and second sides of said stop wall, and
a linking member that is connected to said first sides of said outer side walls, and that cooperates with said stop wall and said outer side walls to define a receiving space adapted for receiving an end portion of the wiper arm, said shell unit being formed with an opening that is defined cooperatively by said second side of said stop wall and said second sides of said outer side walls, that is in spatial communication with said receiving space, and that is adapted for extension of the end portion of the wiper arm therethrough in the axial direction into said receiving space; and
a connecting member disposed on said linking member and movable between a connected position adapted for connection to the end portion of the wiper arm, and a separated position adapted for separation from the end portion of the wiper arm.

9. The windshield wiper assembly as claimed in claim 8, wherein said connecting member has an access portion connected to said linking member and resiliently swingable between the connected and separated positions, and an engaging portion connected to and co-movable with said access portion, said engaging portion being adapted to be connected to the end portion of the wiper arm when said access portion is at the connected position, and to be separated from the end portion of the wiper arm when said access portion is at the separated position.

10. The windshield wiper assembly as claimed in claim 8, wherein:
said shell unit further includes
a pair of inner side walls disposed in said receiving space, each of said inner side walls being parallel to a respective one of said outer side walls and cooperating with the respective one of said outer side walls to define a guide groove that is in spatial communication with said opening and that is adapted for retaining separably a portion of the wiper arm therein, and
a reinforcing rod interconnecting said inner side walls; and
each of said inner side walls is formed with a protrusion at an end portion thereof opposite to said linking member in the axial direction, said protrusion being adapted to abut slidably against the portion of the wiper arm retained in a respective one of said guide grooves during the extension of the wiper arm into said receiving space until said connecting member is at the connected position and the end portion of the wiper arm is connected to said connecting member, and having an end surface that is distal from and parallel to a corresponding one of said inner side walls and that has rounded edges.

11. The windshield wiper assembly as claimed in claim 10, wherein said stop wall is formed with a through hole that is in spatial communication with said receiving space.

* * * * *